United States Patent [19]

Bell, III

[11] 4,157,013
[45] Jun. 5, 1979

[54] WATER COOLED AUTOMOTIVE GAS TURBINE ENGINE

[75] Inventor: Albert H. Bell, III, Birmingham, Mich.

[73] Assignee: General Motors Corporation, Detroit, Mich.

[21] Appl. No.: 831,616

[22] Filed: Sep. 8, 1977

[51] Int. Cl.² .................... F02C 7/10; F02C 7/12
[52] U.S. Cl. .................. 60/39.51 H; 60/39.66
[58] Field of Search ............ 60/39.16 R, 39.51 H, 60/39.66; 415/114

[56] References Cited

U.S. PATENT DOCUMENTS

| | | | |
|---|---|---|---|
| 1,931,545 | 10/1933 | Holzwarth | 60/39.16 R |
| 2,307,042 | 1/1943 | Holzwarth | 60/39.66 |
| 2,656,677 | 10/1953 | Peterson | 60/39.17 |
| 3,077,074 | 2/1963 | Colman et al. | 60/39.51H |
| 3,203,181 | 8/1965 | Benson | 60/39.51 H |
| 3,667,220 | 6/1972 | Dekeyser | 60/39.51 H |

*Primary Examiner*—Louis J. Casaregola
*Attorney, Agent, or Firm*—J. C. Evans

[57] ABSTRACT

A rotary disc, regenerative type automotive gas turbine engine has a water cooled block for supplying hot water to a cab heater core and for supporting a gasifier spool and a power turbine spool within a core section of the block which receives high pressure air from a rotary regenerator matrix disc for flow to a combustor for supplying motive fluid to a gasifier turbine and power turbine with exhaust flow directed from the core section through the regenerator matrix disc and wherein the water cooled block includes an integral planar surface thereon defining a reference plane for the rotary regenerator matrix with the high pressure inlet air and low pressure exhaust gas being directed therethrough for heating the inlet air and wherein the block further includes a water coolant filled passage therethrough in surrounding relationship to the power turbine to act as a containment mass therearound; the water coolant filled passage being located in close proximity to the planar surface defining the reference plane for the generator matrix; said passage also being located adjacent drive components for the regenerator to reduce thermal distortion of the reference plane and to cool regenerator drive components during engine operation.

4 Claims, 8 Drawing Figures

WATER COOLED AUTOMOTIVE GAS TURBINE ENGINE

This invention relates to gas turbine engines and more particularly to water cooled gas turbine engines.

Various proposals have been suggested for cooling of combustion turbine apparatus. For example, in U.S. Pat. No. 2,307,042, issued Jan. 5, 1943, to H. Holzwarth a water jacket is located around a gas turbine to cool the highly heated parts therein. The system includes a plurality of electric motor driven liquid pump components for supplying the liquid coolant to the water jacket components and is intended for use in stationary power plants. In the Holzwarth arrangement, improved means are provided for controlling and separating steam generated within the water jacket during power plant operation.

Other examples of water cooled stationary power plants are set forth in U.S. Pat. No. 892,206 issued June 30, 1908, to V. G. Apple; U.S. Pat. No. 969,760 issued Sept. 6, 1910, to S. A. Moss and U.S. Pat. No. 2,265,677 issued Oct. 27, 1953, to A. C. Peterson. Each of these arrangements show the water cooled system surrounding a part of a high temperature gas turbine power unit for extracting heat from the high temperature components of the gas turbine engine. All the aforesaid cooling arrangements are for use in stationary plants and include the requirement for an external pump system for circulating liquid coolant through the gas turbine coolant jackets.

In non-stationary turbine engine power plants, for example in aircraft gas turbine engines and in vehicular gas turbine applications there have been few proposals for use of liquid coolant. Reluctance to use liquid coolant in such systems in part is due to the need for low temperature protection under reduced temperature conditions, for example, by the use of various antifreeze compositions in the coolant medium.

An example of such non-stationary turbine engine cooling systems is set forth in U.S. Pat. No. 3,756,020, issued Sept. 4, 1973, to Moskowitz et al. An aircraft engine has an external pump 82 driven by a power take off from the engine and is intended to reduce the temperature of critical components in the system by directing coolant through both stator vanes and rotor blades in an internally cooled, closed system which has an air side exposed to cooling air for removing heat from the system. It represents an elaborate system for high performance type engines.

Another proposal for cooling rotating bodies is set forth in the U.S. Pat. No. 3,842,596, issued Oct. 22, 1974, to Vernon H. Gray. This patent shows application of a rotating heat pipe to cool the high temperature component parts of a high temperature gas turbine engine.

All of the aforesaid arrangements have the primary objective of reducing the temperature of the component parts of the gas turbine engine which are exposed to high temperature exhaust gases and are intended to extract heat from the vicinity of the components exposed to such high temperature gases for preventing excessive heating in such components.

While the various proposals are suitable for various stationary and high performance vehicular applications they are inappropriate for low cost, reduced weight, automotive gas turbine engines where engine performance in part depends upon maintenance of distortion free reference surfaces for rotary regenerator matrix discs of the automotive gas turbine engine.

Accordingly, an object of the present invention is to improve automotive gas turbine engines of the type including an engine block having a planar surface integrally formed therein as a reference surface to guide an associated rotary regenerator disc which extracts heat from exhaust gas from a core turbine section and is rotated across an inlet passage to heat compressed air from a core compressor section prior to its passage to a combustor for generating motive gas to drive the turbine by the provision of an integrally formed double walled central block segment defining a continuous, annular water coolant passage having a water fill port and a water outlet formed on a common wall of the block and in communication with the water passage around the gas turbine section that is in communication with a sump region having an access port thereto connected to an exterior pump housing having an impeller located within the sump and driven by shaft coupled to an aft gear set on the gas turbine engine to circulate water from a radiator through the coolant passage, thence through the outlet and wherein the water passage has a wall segment located in close proximity to the planar reference surface for the rotary regenerator matrix disc to cool the reference surface and reduce thermal distortion therein so as to maintain high regenerator seal efficiency during gas turbine operation.

Still another object of the present invention is to provide an improved light weight, water cooled gas turbine engine for automotive use including an engine block having a pair of opposed planar reference surfaces thereon to support rotary regenerator assemblies on the block, the block including an aft mounted gear set having an output therefrom to drive a drive train transversely of the block operatively connected to each of the regenerators for rotating them with respect to the planar reference surfaces and wherein the block includes an integral double walled water coolant passage in surrounding relationship to a core turbine section having a fill inlet and a water outlet on a common wall of the housing and including a sump region in communication with a pump assembly located on the engine block and having a drive shaft driven by the aft mounted gear set and wherein the water coolant passage includes first wall segments common to the planar reference surfaces of the regenerator matrix discs and second wall segments in close proximity to the drive train for the regenerator assemblies to prevent excessive thermal distortion in the regenerator drive and operating components of the gas turbine engine to improve regenerator efficiency.

Still another object of the present invention is to provide a water cooled gas turbine engine of the type set forth in the preceding object wherein water distributed from the coolant passage is directed to an external heater core for cab heating.

Further objects and advantages of the present invention will be apparent from the following description, reference being had to the accompanying drawings wherein a preferred embodiment of the present invention is clearly shown.

Figure 1:
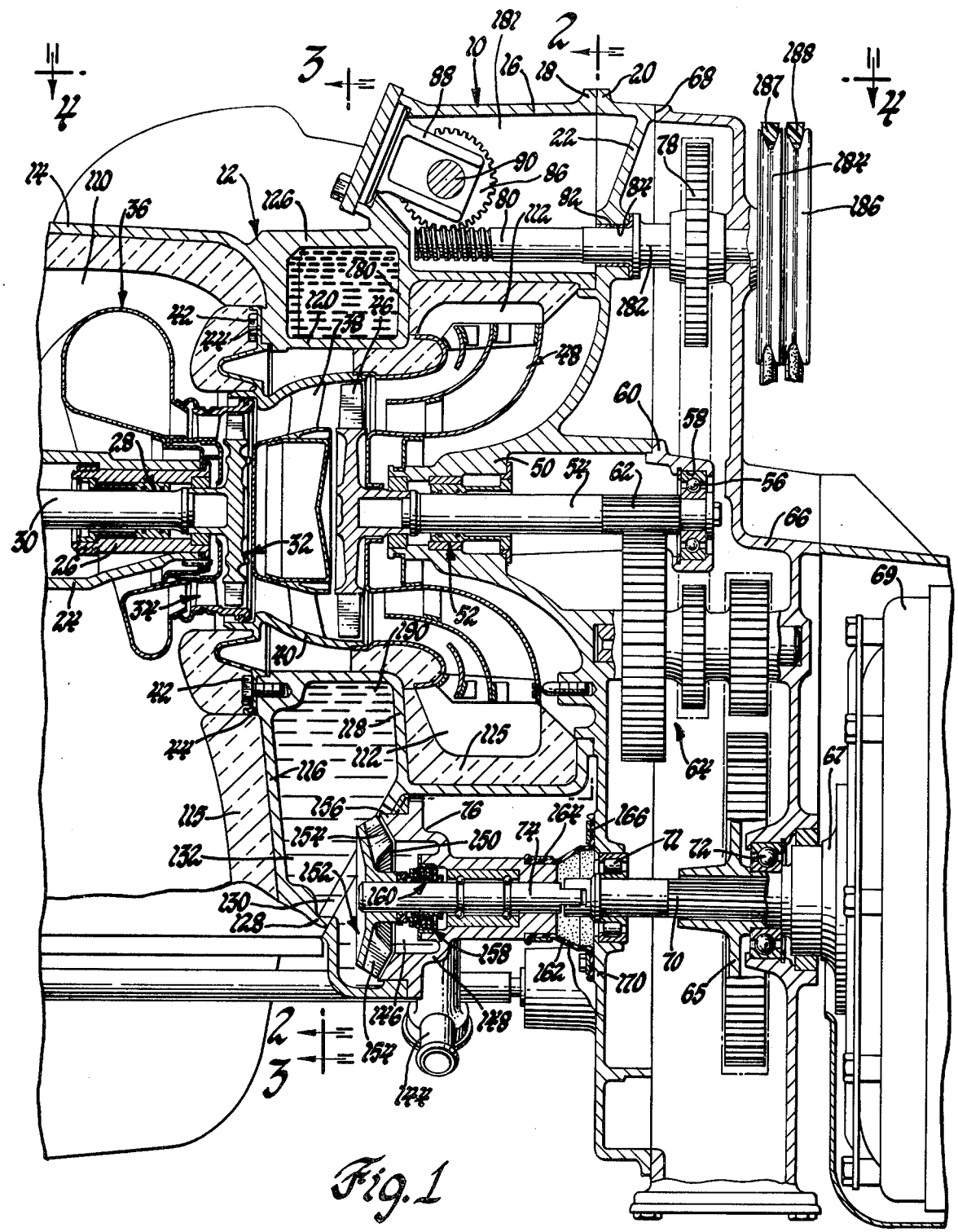
FIG. 1 is a fragmentary, longitudinal sectional view of a gas turbine engine including the present invention.
Figure 2:
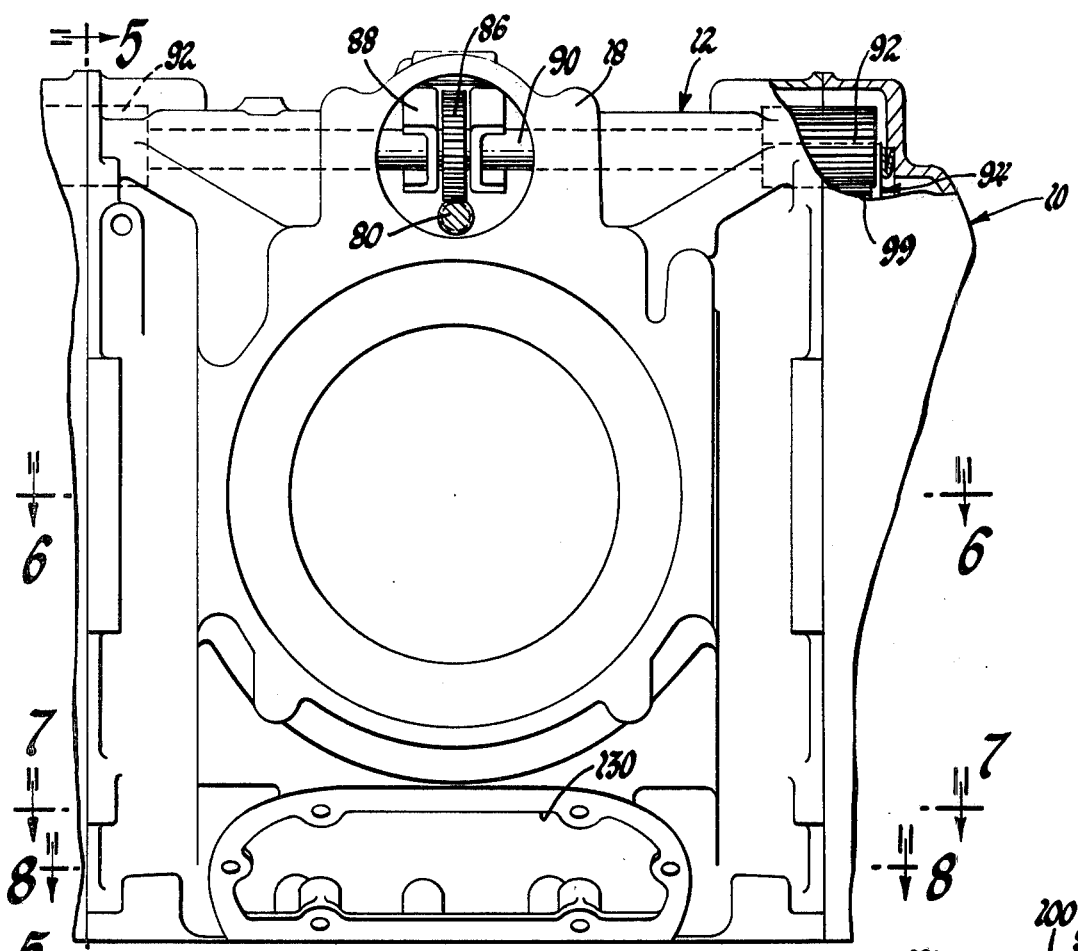
FIG. 2 is a vertical sectional view taken along the line 2—2 of FIG. 1 showing the aft end of an engine block in FIG. 1 with the core operating components of the gas turbine engine removed.

Referring to the drawings, in FIG. 1 an automotive gas turbine engine 10 is illustrated. It includes a cast engine block 12 constructed in accordance with the present invention and having an inlet end 14 and aft end 16. The aft end 16 has a peripheral flange 18 thereon joined to a flange 20 of a rear bulkhead 22. The inlet end 14 supportingly receives a forward bulkhead 24 having a radially inwardly directed bearing support 26 thereon that supportingly receives a bearing and seal assembly 28 for supporting and sealing a gasifier turbine shaft 30 having a gasifier turbine 32 connected thereto and located radially inwardly of a nozzle and shroud assembly 34 for directing hot gases from a combustor 36 across the gasifier turbine 32.

Exhaust gas from the turbine 32 passes through and is accelerated by a power turbine nozzle 38 supported on an annular shroud 40 connected by suitable fastening means 42 to the outwardly directed face 44 of the inlet end 14 of the engine block 12. A power turbine 46 is located immediately downstream of the nozzle 38 and in communication with an exhaust diffuser 48 that is supported on a seal and bearing housing 50 on the rear bulkhead 22. A bearing and seal assembly 52 within the housing 50 supportingly receives a shaft 54 connected to the power turbine 46 at one end thereof and to an outboard bearing 56 on the opposite end thereof secured within a bore 58 on an outboard extension 60 of the rear bulkhead 22. The shaft 54 includes a splined surface 62 thereon for driving a reduction drive gear train 64 located within a reduction gear housing 66 secured to the outer annular face 68 of the rear bulkhead 22. Gear train 64 includes an output gear 65 to drive a coupling 67 to a vehicle transmission 69.

The reduction gear housing 66 includes a cross shaft 70 supported by bearings 71, 72 at opposite ends thereof located near the bottom of the reduction gear housing 66. Shaft 70 extends outboard of bulkhead 22 for connection to one end of a water pump shaft 74 of a liquid cooling pump 76 for directing liquid coolant to the block 12 in a manner which will reduce thermal distortion at key points within the block 12.

Additionally, the gear train 64 includes a spur gear 78 connected to one end of a regenerator drive shaft 80 that is supported by a sleeve bearing 82 in a bore 84 through the rear bulkhead 22. The regenerator worm shaft 80 is meshed with regenerator drive worm gear 86 guided by side bearing 88 and connected to a cross shaft 90. Shaft 90 has drive pinions 92 at either end thereof to mesh with rotary heat regenerator assemblies 94, 96 at either side of the engine 10.

Each of the regenerator assemblies 94, 96 includes a rotatable matrix disc 98 having a ring gear 99 on the outer periphery thereof that is driven by the drive pinions 92.

In accordance with certain principles of the present invention, each of the regenerator assemblies 94, 96 includes an inboard planar surface 100 thereon of annular form that supportingly receives the leaf seal 102 of an annular inboard seal assembly 104 to seal the outer periphery of each of the regenerators 94, 96. A cross arm 106 has a cross arm seal 107 to separate high pressure air inlet 108 which is aligned with an inboard high pressure air inlet passage 110 in fluid communication with the combustor 36. Each of the regenerator assemblies 94, 96 further includes an exhaust passage 112 (FIG. 1, from diffuser 48) that is in alignment with an exhaust outlet 114 connected respectively to the outlet of exhaust diffuser 48 within the block 12 and to an engine exhaust outlet.

Figure 6:
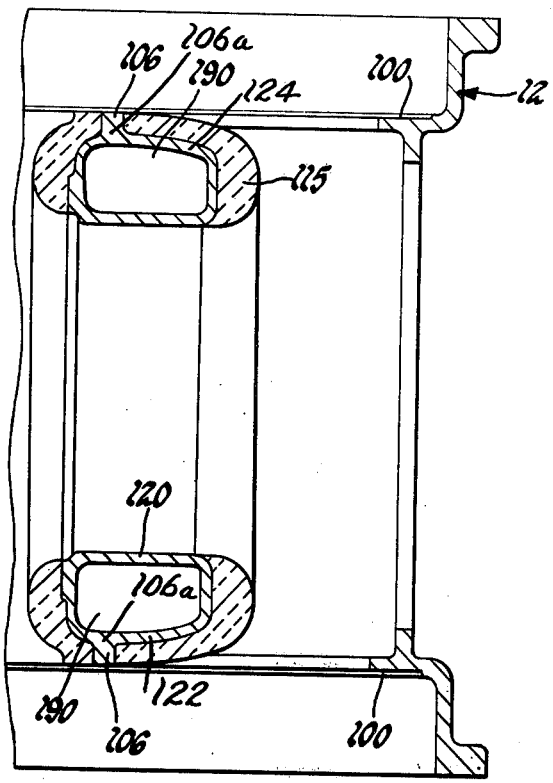
FIG. 6 is a cross-sectional view taken along the line 6—6 of FIG. 2 looking in the direction of the arrows.
Figure 7:
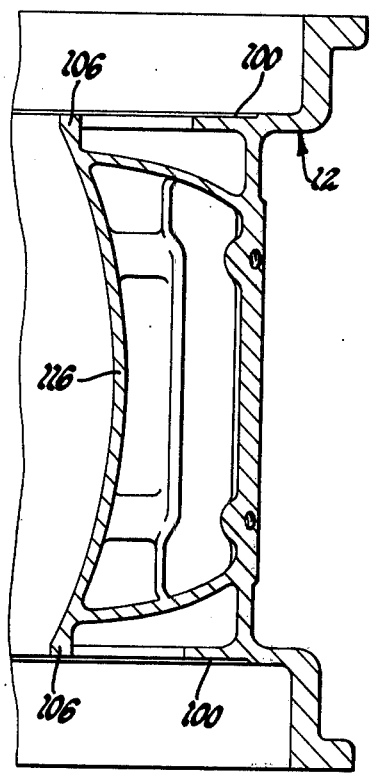
FIG. 7 is a cross-sectional view taken along the line 7—7 of FIG. 2.
Figure 8:
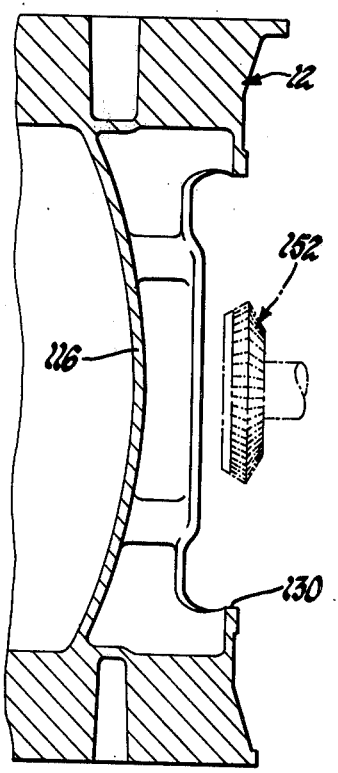
FIG. 8 is a cross-sectional view taken along the line 8—8 of FIG. 2.

The present invention is directed to an improved arrangement to maintain minimal distortion in the planar reference surfaces 100 of the block 12 that support the inboard seal assemblies 104 for sealing engagement with the inboard face of the rotatable matrix 96 as well as the surface of cross arms 106 which is cast integrally of the block 12. As seen in FIG. 6, each cross arm 106 has a root segment 106a that is integral with block 12 at wall portions 122, 124 to be described.

In some cases the heat generated by the gas turbine operation is sufficient to cause undesirable distortion within the seal engaging planar extent of the surfaces 100 and cross arms 106 even though they are bounded by insulation layers 115 over the inner surface of block 12 to shield against direct radiation from hot engine parts. Water cooled passages are associated with the block 12 in a unique fashion. Coolant is water based with known anti-freeze added as required.

Accordingly, the present invention includes an improved water filled inner wal configuration around the turbine sections including the gasifier turbine 32 and the power turbine 46 to extract excessive heat from the block 10 so as to minimize the such distortion problems. Further, the configuration to be described reduces thermally induced block cracks.

Thus, block 12 includes a pair of centrally located, axially spaced walls 116, 118 connected by a radially inwardly located, annular wall segment 120 spaced immediately radially outwardly of the shroud 40 and inlet to diffuser 48.

The block 12 further includes side wall portions 122, 124 connected to an upper wall segment 126 at one end thereof and being joined by a base segment 128 at the opposite end thereof. The base segment 128 includes an ovally shaped opening 130 to receive water from pump 76 in a sump region 132 formed between the side walls 122, 124 and the axially spaced walls 116, 118. The sump region 132 is in communication with a generally vertically curved passages 134, 134 formed between the side walls 122, 124 and the annular wall 120 for communicating the sump 132 with an outlet 136 adapted to be connected to a hose 138 connected to an external radiator 140 having a return hose 142 therefrom connected to an inlet 144 to an inlet chamber 146 within a pump housing 148 that is in communication with the axial inlet eye 150 of a coolant circulating centrifugal impeller 152. Impeller 152 has blades 154 thereon located in spaced relationship to an annular shroud 156 formed on the inside surface of pump housing 148. The pump impeller 152 is connected to one end of the shaft 74 to discharge liquid into sump 132 and upward through passages 134, 135 to directly cool block 12 at cross arms 106 as seen in FIG.

6 and by conduction from walls 122, 124 to cool surfaces 100.

A seal assembly 158 is supported on the inboard end of the housing 148 around shaft 74 to seal a shaft bearing assembly 160. The opposite end of the bearing assembly 160 is sealed by a flexible bellows 162 having one end connected by a clamp 164 to the bearing housing 166 and the opposite end connected by a clamp 168 to a wall 170 on the rear bulkhead 22.

During gas turbine engine operation the impeller 152 is driven to circulate liquid coolant from the inlet 144 hence upwardly in curved relationship through the passages 134, 135 to the outlet 136 for flow through the radiator 140 to extract heat from the engine.

Figure 4:
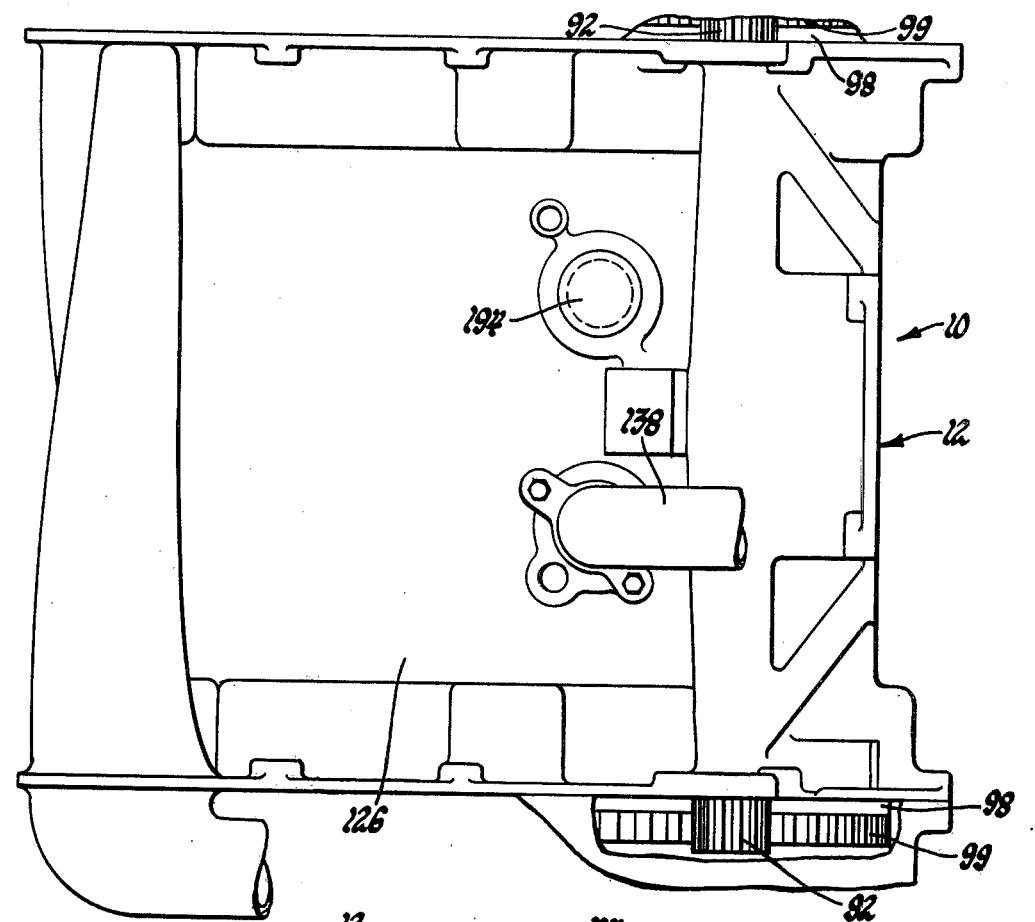
FIG. 4 is a top elevational view of the engine block of FIG. 2 looking in the direction of the arrows 4—4.
Figure 5:
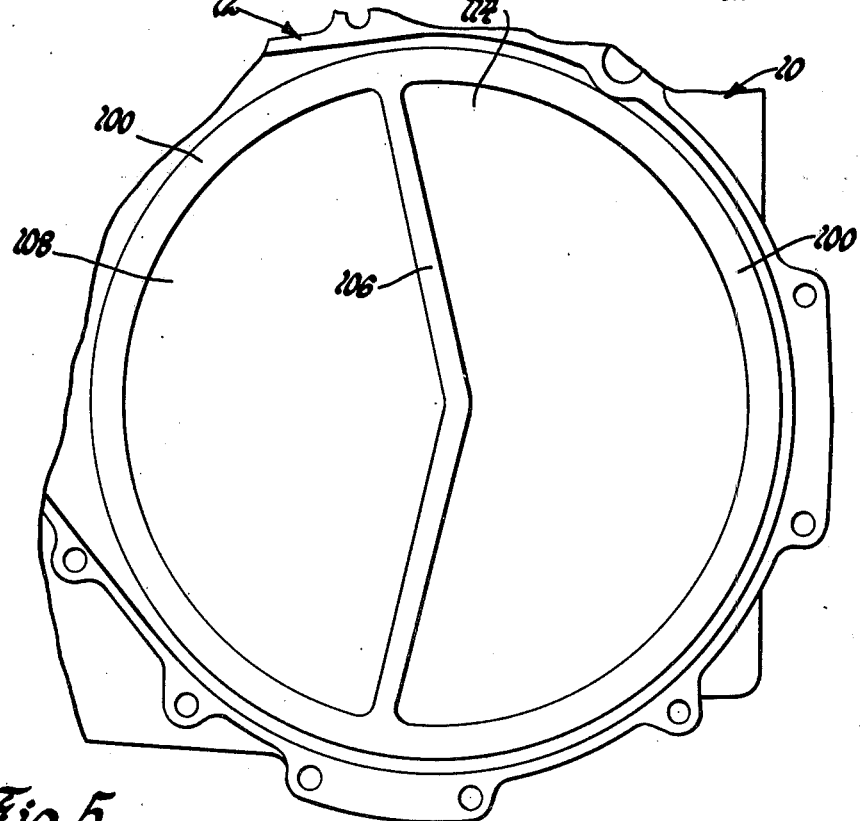
FIG. 5 is a cross-sectional view taken along the line 5—5 of FIG. 2 looking in the direction of the arrows.

Another feature of the invention is that the heated water can be used to heat a vehicle cab. Thus an outlet 172 is connected to a heater supply hose 174 to a cab heater core 176 with its outlet 178 connected to the return hose 142 as best shown in FIG. 4.

Figure 3:
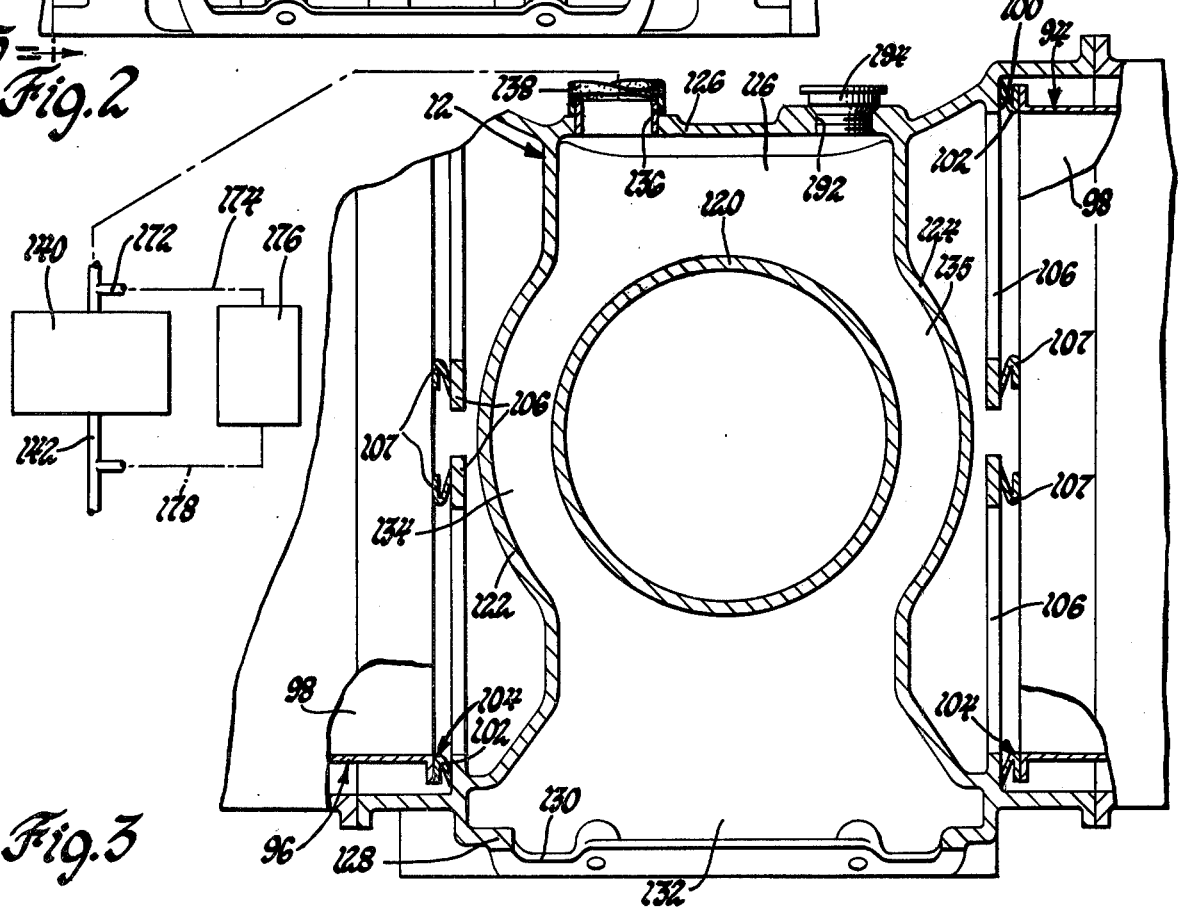
FIG. 3 is a vertical sectional view like FIG. 2 but taken along the line 3—3 of FIG. 1 looking in the direction of the arrows.

The full discharge of coolant from the pump impeller 152 is directed with respect to an upper segment 180, as shown in FIG. 1, of the wall 118 that serves to cool the block cavity 181 having the shaft 80 therein for operating the side supported, rotary regenerators 94, 96 during gas turbine engine operation. Another feature is that the shaft 80 for transferring power from the gear set 64 to the regenerator cross shaft 90 is connected to a shaft extension 182 connected respectively to outboard pulleys 184, 186 for connection to an alternator and air conditioner drive belt 187, 188, respectively. The location of liquid coolant with respect to the shaft 80 assures minimal distortion therein during gas turbine operation. Also, the core of coolant water 190, best seen in FIGS. 1 and 3, is a material mass that is located as a containment for turbine 46 if it overspeeds. Coolant is supplied to passages 134, 135 through a fill port 192 in wall 126. A filler cap 194 closes port 192.

While the embodiments of the present invention, as herein disclosed, constitute a preferred form, it is to be understood that other forms might be adopted.

The embodiments of the invention in which an exclusive property or privilege is claimed are defined as follows:

1. A regenerative automotive gas turbine engine comprising a combustor, a pair of rotary regenerator assemblies with inboard seals, a block including an annular regenerator seal surface on opposite sides thereof for supportingly receiving said inboard seals, a gas turbine section in said block having a power shaft, said power shaft connected to a power turbine on one end thereof, means for directing exhaust from said combustor across said turbine and through said regenerator assemblies, said block including spaced walls defining a water passage therein located radially outwardly of the gas turbine in surrounding relationship thereto, a water fill in said passage to define a liquid containment ring around said power turbine seal cross arms integral with the radially outer wall of said water passage and having opposite ends connected to each of said annular seal surfaces, each of said cross arms including a root segment, a water pump connected to said block at a low point thereon, said water pump including an impeller having a plurality of radial blades thereon including an inlet edge in communication with the inlet to said water pump and an outlet edge thereon in direct communication with said water passage for discharging water upon operation of the pump directly into said water passage for circulation therethrough in surrounding relationship to the power turbine for removing heat from the block through said root prior to conduction thereof to the annular seal surfaces thereby to maintain the temperature of the seal surfaces and said cross arm below a thermal distortion level.

2. A regenerative automotive gas turbine engine comprising a combustor, a pair of rotary regenerator assemblies with inboard seals, a block including an annular regenerator seal surface on opposite sides thereof for supportingly receiving said inboard seals, a gas turbine section in said block having a power shaft, said power shaft connected to a power turbine on one end thereof, means for directing exhaust from said combustor across said turbine and through said regenerator assemblies, said block including spaced walls defining a water passage therein located radially outwardly of the gas turbine in surrounding relationship thereto, a water fill in said passage to define a liquid containment ring around said power turbine, a water pump connected to said block at a low point thereon, said water pump including an impeller having a plurality of radial blades thereon including an inlet edge in communication with the inlet to said water pump and an outlet edge thereon in direct communication with said water passage for discharging water upon operation of the pump directly into said water passage for circulation therethrough in surrounding relationship to the power turbine for removing heat from the block prior to conduction thereof to the annular seal surfaces thereby to maintain the temperature of the seal surfaces below a thermal distortion level, regenerator drive means including a gear train on one end of said block and including an input gear connected to the opposite end of the power shaft, said gear train including a regenerator drive gear and regenerator drive shaft, a regenerator drive cross shaft including worm means coupled to said regenerator drive shaft and said regenerator assemblies, said block including a cavity for housing said regenerator drive cross shaft and said worm means, said cavity having a wall segment thereon common to said water passage and exposed to total liquid flow through water passage for cooling and regenerator drive means.

3. In an automotive gas turbine engine and transmission having a compressor and combustor means for receiving air from the compressor and fuel to produce a motive fluid and including a pair of rotatable regenerator matrices thereon with inboard seals for extracting energy for gas flow from the engine and preheating air flow into the combustor means, the improvement comprising: an engine block including an annular seal surface on each side thereof for supportingly receiving inboard seals of the regenerator matrices, an interior bulkhead including annular radially inwardly located wall segments thereon defining a water filled passage, a power turbine located concentrically within said wall segments to be contained by a water core in said passage and including a power shaft therefrom, a power transfer reduction gear train, a case for said train supported on said housing, said gear train including an alternator drive shaft, said alternator drive shaft having a driven gear thereon, means for coupling said driven gear to the power shaft, a transmission drive shaft, gear means on said transmission drive shaft for coupling said power shaft to the transmission, said transmission drive shaft having an extension directed outwardly of said case and in parallel to the power shaft and said alternator drive shaft, a water pump supported on said block driven by said extension, said water pump including a radial impeller thereon including an inlet and an outlet, a radiator, means for connecting said radiator to the inlet of said water pump, said outlet of said water pump directly discharging into said water filled passage, said water pump being operated at the same speed as the transmission drive shaft for circulating coolant against said radially inner wall segment for removing heat from the housing prior to the heat conduction thereof to the annular seal surfaces thereby to prevent thermal distortion therein.

4. In an automotive gas turbine engine and transmission having a compressor and combustor means for receiving air from the compressor and fuel to produce a motive fluid and including a pair of rotatable regenerator matrices thereon with inboard seals for extracting energy from gas flow from the engine and preheating air flow into the combustor means the improvement comprising: an engine block including an annular seal surface on each side thereof for supportingly receiving inboard seals of the regenerator matrices, an interior bulkhead including annular radially inwardly located wall segments thereon defining a water filled passage, a power turbine located concentrically within said wall segments to be contained by a water core in said passage and including a power shaft therefrom, a power transfer reduction gear train, a case for said train supported on said housing, said gear train including an alternator drive shaft, said alternator drive shaft having a driven gear thereon, means for coupling said driven gear to the power shaft, a transmission drive shaft, gear means on said transmission drive shaft for coupling said power shaft to the transmission, said transmission drive shaft having an extension directed outwardly of said case and in parallel to the power shaft and said alternator drive shaft, a water pump supported on said block driven by said extension, said water pump including a radial impeller thereon including an inlet and an outlet, a radiator, means for connecting said radiator to the inlet of said water pump, said outlet of said water pump directly discharging into said water filled passage, said water pump being operated at the same speed as the transmission drive shaft for circulating coolant against said radially inner wall segment for removing heat from the housing prior to the heat conduction thereof to the annular seal surfaces thereby to prevent thermal distortion therein, a crossover shaft assembly supported in said block including an input component driven by said alternator drive shaft, said input component means being located in close proximity to a wall segment of water cooled passage for removing the heat from said drive components during operation of said engine.

* * * * *